Jan. 29, 1957  V. G. BIRO  2,779,369
FOOD GRINDER GUARD
Filed July 14, 1955
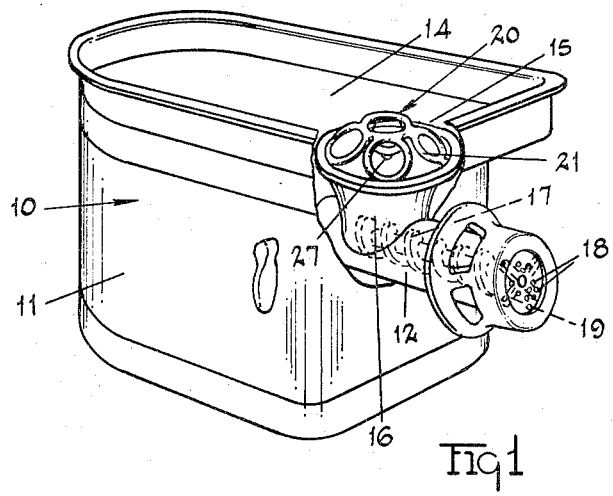
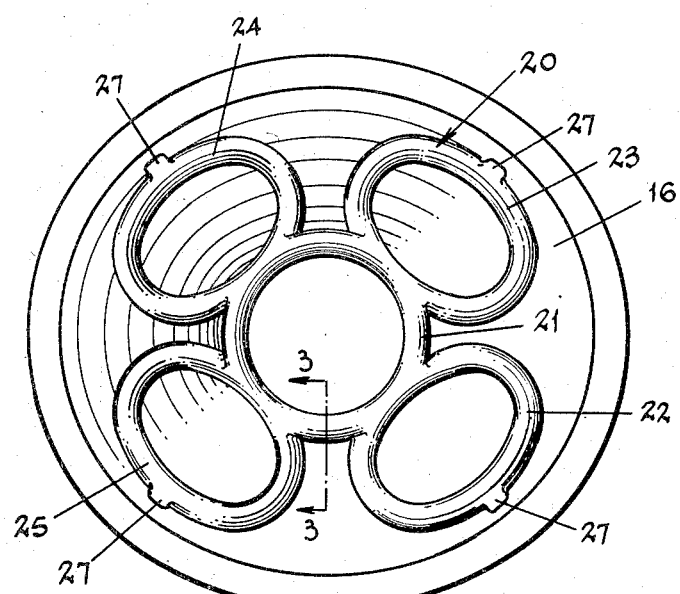
INVENTOR.
Vincent G. Biro
BY
ATTORNEY

United States Patent Office 2,779,369
Patented Jan. 29, 1957

2,779,369

FOOD GRINDER GUARD

Vincent G. Biro, Marblehead, Ohio, assignor to The Biro Manufacturing Company, Marblehead, Ohio, a corporation of Ohio Application July 14, 1955, Serial No. 522,025

1 Claim. (Cl. 146—182)

My invention relates generally to food grinder equipment and particularly to means for safe-guarding the user of such equipment from injury in its use.

As is well known, most food grinders comprise the fundamental elements of a chamber, usually cylindrical in shape, to which meat chunks or pieces are fed and where they are gathered and compressed by a worm or screw rotating in the chamber. The thus gathered and compressed meat is then extruded through openings in one end of the chamber into the path of rotating cutter knives which cut the extruding meat into small pieces.

Present day food grinders, particularly those used for grinding meats in butcher shops and the like are power driven. As a consequence, these grinders not only exert considerable meat grinding power but also operate at fairly high speed. By reason of such power and speed, these machines have certain inherent dangers in their use. One particular dangerous operation in the use of a power driven food grinder resides in the manual feeding of meat into the grinder chamber.

That is because the common provision for feeding meat to be ground to the conventional meat grinder consists of an opening in a lateral wall of the cylindrical grinder chamber mentioned. In some structures, such opening is surrounded by and registers with an upstanding hopper and the meat to be ground is fed through that hopper. Often a user, in order to expedite the grinding operation or to supplement the gathering action of the grinder worm, will attempt to push meat into the chamber through the opening. Instead of using a tamp or pestle to do this, the operator often uses his fingers. This, of course, puts the user's fingers in peril and, if he fails to get them free in time amputation or exceedingly painful mashing of the user's fingers may result. The danger of such occurrence has become so prevalent that the industrial and safety authorities of various states in the United States now require, by code or regulation, the provision of adequate safe guards on all commercial meat and food grinder equipment.

In an effort to deal with this problem and anticipate such requirements, my predecessors, one of whom is G. S. Foster named in U. S. Letters Patent No. 1,951,826, have provided a flat guard plate in vertically spaced relation to the feeding opening of the grinder chamber. Such flat plate is usually perforated and supported on legs which in their spacing, horizontally, and their heighth relative to the grinder cylinder feed opening provide, with said perforations, openings of a size and relation to the grinder feed opening such that the human hand or its finger parts may not be passed under or through the plate or between the legs to reach into the grinder chamber opening. The principle upon which these early food grinder guards operated is that of presenting a maze of baffles along the path to the chamber feed opening which could not be followed by the hand or fingers attempting to reach the feed opening.

Although these prior devices did prevent the user from accidentally putting his fingers in danger, they had certain faults. To eliminate such faults is the principal object of my invention.

One of the faults to which I have reference and which has been severely criticized by food grinder users, particularly commercial users, is that the guard plate in the prior art structures, in the plate regions between perforations, acts to seriously check the feeding of materials to be ground to the grinder chamber. In other words, the labyrinth of baffles provided to check the user's fingers also seriously blocks the feed of meat. This reduces the efficiency of the food grinder.

In addition, when the guard is formed by perforating a flat plate, as in the prior art, the edges of the plate around the perforations retain their edge corners. These edge corners, being rather sharp, tend not only to retard the feed of material through the perforation but also tends to scrape the material being fed and to collect the resultant scrapings. To remove these scrapings, the user must maintain readily accessible wipe cloths and periodically attend such task.

Another fault of these early food grinder guards lay in the difficulty experienced in attempting to clean them. Cleaning equipment, particularly the commercially used type, is not only an important requirement, but of legal necessity. To do this properly needs almost a daily wash-up. Where the food grinder guard has, as the prior art plate guards do, back surfaces of appreciable area, sharp edges and corners around the perforations, thorough cleaning is a time consuming and disagreeable task which the user usually shirks or passes over, with only an apparent doing.

To overcome these faults and thus to provide a food grinder guard having the minimum resistance to meat feeding, easily cleaned and to keep clean, my invention has for an object to provide a food grinder guard formed by a grid of integrated circular shapes or ring-like bodies, each smaller in size than the human hand and arranged in a cluster relation and providing reticulated unit in monitoring relation over and around the feeding opening in a food grinder. By this arrangement, a protecting rigid net-work of curvilinearly extending rod metal prevents the user of the food grinder from inserting his hand or fingers on that hand into the region of danger within the grinder chamber, but the passage of material being fed to the grinder is not seriously hampered, as in the prior art structures. The ring shapes of a food grinder guard embodying my invention are circular in cross-section, having no sharp edges to engage and scrape the material being fed and presenting low resistance to meat feeding on the one hand and to wiping, as for cleaning, on the other.

Another object of my invention is to provide a food grinder guard grid formed from an integrated cluster of metal ring shapes arranged as a dome, with one ring shape being concentrically disposed to and vertically spaced above the grinder feed opening and being the centrally disposed shape with reference to the surrounding other ring shapes and being the entire means connecting said other ring shapes together. A still further and more particular object is to provide such reticulated dome in which central ring shape extends horizontally and the ring shapes surrounding said central ring shape are each inclined outwardly to it to form dome sides. By such arrangement, the guard resists deflection downwardly, as would enable the user, notwithstanding the guard, to place his fingers in danger.

A still further and particular object is to provide means in the form of boss extensions from each of the said surrounding ring shapes, adapted to engage the food grinder and support the guard in monitoring relation to the feeding opening of the grinder chamber.

My invention has for further objects to provide other advantageous structures and arrangements which appear from the following description and an examination of the accompanying drawing. Structures containing my invention may take various forms. The form I have selected to describe constitutes a specific embodiment of a food grinder guard embodying the features of my invention. Reference to the accompanying drawing facilitates such description. In making such description or in reference to such accompanying drawing, I do not imply, however, that variation from the structure I have selected, which do in fact embody my invention manifest and claimed herein, is beyond the contemplation of my invention.

Figure 1 of the accompanying drawing illustrates a perspective view of a food grinder mounting a food grinder guard embodying my invention, parts of the grinder being shown broken away to facilitate illustrating certain interior parts of the grinder. Figure 2 illustrates an enlarged plan view of the food grinder guard shown in Figure 1. Figure 3 illustrates a view of cross-section taken along the plane of the line 3—3 indicated in Figure 2.

The problems with which this invention is concerned arose with the demand for high speed, low cost mass butchering and the introduction of power tools and the use of frozen meat to meet this demand. Until that time, meat grinding was done by hand operated machines, working on fully thawed meat in the leisure pace of the old time butcher shop.

The matter of haste and consequent danger of accident did not enter into these earlier operations. Very often, there were no guarding means controlling the grinder feed opening in these earlier machines, the meat being forced, if at all, through the opening in the grinder chamber by a wooden tamp tool. With the growing demand for production at low cost, however, the tamp was discarded and the tempo of operations picked up.

Today, certain states, such as the State of California, for one, have stringent laws prohibiting the use in their states of power driven food grinders except that the grinder be provided with food grinder guards approved by their safety inspectors. Embodiments of my inventions, of which that shown in the accompanying drawing is a specimen, have been tested and been found to meet the needs of the Division of Industrial Safety of the Department of Industrial Relations of the State of California.

Such embodiment of my invention illustrated in the accompanying drawing I show mounted on a power driven food grinder 10. The grinder 10 has a housing 11 for enclosing such grinder parts as its motor, its controls and their support and the cylindrical grinder chamber 12. On its upper surface the housing 11 has a tub 14, into which the chunk meat to be ground is first placed. The tub 14 communicates with the chamber 12 through an opening 15 in the floor of the tub 14 and through a hopper 16. Thus, meat placed in the tub 14 may feed by gravity through the tub opening 15 and hopper 16 into the grinder chamber 12.

Within the grinder chamber 12, there is a food gathering and compressing worm 17. The worm 17 is connected to the motor (not shown) in the housing 11 and caused thereby to rotate, thus to gather and compress meat fed to the chamber 12. The meat, thus compressed, is extruded outwardly from the chamber 12 through openings 18 in the end of the chamber 12, where cutting blades of a rotating cutter 19 cuts the meat into small pieces. This and the manner and means by which it is done are well known to the trade and form no part of my invention.

Surmounting the hopper 16 and in monitoring relation to the opening 15 is a guard 20 embodying the features of my invention. The guard 20 comprises an integrated plurality of circular shapes or ring-like bodies of which the body 21 is the central one and about which the four other ring-like bodies 22, 23, 24 and 25 cluster, as shown. The ring bodies are formed of rod-like metal, as shown in Figure 3 of the accompanying drawing, having a circular outline 26 in cross-section. The bodies 22, 23, 24 and 25 merge with and are, in a sense, tangential to the body 21 which forms the sole means of connecting the clustering bodies together.

As will be seen from Figure 1 of the accompanying drawing the body 21 extends horizontally, in vertically spaced and concentric relation to the opening 15 in the tub 14. The other bodies incline downwardly and outwardly from the central body 21 thus forming a cap or dome over the hopper 16. Preferably, the bodies 22, 23, 24 and 25 each have a boss extension 27, providing feet by which the guard 20 may be mounted and, if desired, locked as by welding or integrating to the mouth of the hopper 16.

It will be seen now, when meat or other foods to be ground are placed in the tub 14, the user may manually direct the meat to and through the ring bodies. The bodies present a minimum resistance to the introduction of such meat through the opening since they occupy only that space which is needed to balk the operator from inserting his hand or fingers into the chamber 12. The resistance to feeding into the chamber 12 is low because of the complete absence on the guard of retarding corners and edges. This eliminates scraping and reduces the need for cleaning this food grinder guard. Also because of the space occupied by the guard bodies and of their mentioned circular non-impeding form, cleaning, as by cloth wiping, may be quickly and thoroughly accomplished.

The outwardly inclined relation of the clustering ring bodies about the central body 21 and the provision of the feet bosses 27 tends to prevent deflection of the guard 20, as by downward pressure, of the central ring body 21. This insures maintenance of the safe guarding monitor relation of the guard 20 to the opening 15 even though the user, either intentionally or unintentionally, should take action tending to push the central ring body down and thus obviate the control exercised by the guard.

Thus, a food grinder guard embodying my invention though simple in detail may perform the tasks for which it is intended in an efficient and satisfactory manner.

I claim:

In combination with a food grinder having a food grinding chamber, a food feeding hopper in communication at its lower end with said food grinding chamber and having a guard at its upper end and integral therewith to prevent the accidental insertion of the food grinder user's hand through said hopper into said food grinding chamber, said guard comprising an integrated plurality of five metal ring-like bodies of equal size and circular section, one of said bodies extending in coaxial relation with the throat of said hopper and through a plane in spaced relation to and above said hopper upper end, each of the remaining four of said bodies disposed tangentially to and in generally declining and radially extending relation from four equally spaced points on the perimeter of the first mentioned body and towards circumferentially spaced points within said hopper and inwardly spaced from the upper end edge of said hopper, said four bodies being in a cluster about said first mentioned body to form a reticulated dome in which said first mentioned body extending horizontally across the opening of said hopper constitutes the crown of the dome and the remainder of said bodies extending inclinedly downwardly therefrom toward said spaced points within the hopper and inwardly spaced from the upper end edge thereof form the sides of the dome; each of the last named bodies having a boss extending substantially radially of and outwardly therefrom at a point diametrically opposite to the point of engagement of said body with the first mentioned body, each said boss being integral with the hopper at one of said spaced points within the hopper and inwardly spaced from the upper end edge thereof to thus support the guard so that the inner surface of said hopper proximate the upper end edge thereof resists the tendency of material being fed through the hopper to said food grinding chamber to spill outside and over the upper edges of said hopper as the material may be urged to do when crowded downward on the guard.

References Cited in the file of this patent

UNITED STATES PATENTS

| | | |
|---|---|---|
| 1,595,836 | Gundlach | Aug. 10, 1926 |
| 2,001,793 | McArdle et al. | May 21, 1935 |